US008549156B1

(12) United States Patent
Croak et al.

(10) Patent No.: US 8,549,156 B1
(45) Date of Patent: Oct. 1, 2013

(54) METHOD AND APPARATUS FOR SHARING A STORED VIDEO SESSION

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1025 days.

(21) Appl. No.: 11/259,018

(22) Filed: Oct. 26, 2005

(51) Int. Cl.
*G06F 15/16* (2006.01)

(52) U.S. Cl.
USPC .............. 709/229; 709/219; 709/232; 725/87

(58) Field of Classification Search
USPC ............................ 709/219, 229, 232; 725/87
See application file for complete search history.

(56) References Cited

U.S. PATENT DOCUMENTS

| | | | | |
|---|---|---|---|---|
| 5,574,778 A | * | 11/1996 | Ely et al. ................... | 379/221.09 |
| 6,889,385 B1 | * | 5/2005 | Rakib et al. ................... | 725/119 |
| 7,103,905 B2 | * | 9/2006 | Novak ............................. | 725/46 |
| 7,631,336 B2 | * | 12/2009 | Diaz Perez ..................... | 725/109 |
| 2002/0032905 A1 | * | 3/2002 | Sherr et al. ...................... | 725/38 |
| 2002/0078176 A1 | * | 6/2002 | Nomura et al. ............... | 709/219 |
| 2002/0095569 A1 | * | 7/2002 | Jerdonek ....................... | 713/155 |
| 2002/0144273 A1 | * | 10/2002 | Reto .............................. | 725/86 |
| 2004/0210925 A1 | * | 10/2004 | Miyazawa et al. .............. | 725/25 |
| 2005/0054325 A1 | * | 3/2005 | Morper ......................... | 455/410 |
| 2005/0177515 A1 | * | 8/2005 | Kalavade et al. ............... | 705/52 |
| 2005/0226170 A1 | * | 10/2005 | Relan et al. .................... | 370/254 |
| 2006/0053456 A1 | * | 3/2006 | Kelly ............................. | 725/87 |

OTHER PUBLICATIONS

DarrenBarefoot.com. "Video Sharing for Friends and Family Only?", Dec. 5, 2006, 6 pages.*

* cited by examiner

*Primary Examiner* — Liangche A Wang

(57) ABSTRACT

A method and apparatus for enabling a user to invite one or more participants in a SoIP network to join a shared video session hosted by the user are disclosed. The present method allows a user to order and store video selections in the network that the user can access later using a personal password. In one embodiment, for all the other users who are invited to join the shared video session, the network provides another one time password that the invited users can use to access the shared video session.

16 Claims, 6 Drawing Sheets

200

300

METHOD AND APPARATUS FOR SHARING A STORED VIDEO SESSION

The present invention relates generally to communication networks and, more particularly, to a method and apparatus for sharing stored video sessions in communication networks, e.g., packet networks such as Service over Internet Protocol (SoIP) networks.

BACKGROUND OF THE INVENTION

As extremely high bandwidth access networks become more accessible to residential subscribers, they enable service providers of these networks to integrate voice, video, and data, thereby providing more convenience for end customers and creating new service opportunities. Due to the multi-service nature of these new services, networks need to provide additional functionalities to end customers to support integrated control of these different types of services. For instance, a user of these advanced services can order a video session to be stored and viewed at a later time. More specifically, the user may want to invite other users in the network to join and watch the previously ordered video session simultaneously.

Therefore, a need exists for a method and apparatus for sharing stored video sessions in a packet network, e.g., a SoIP network.

SUMMARY OF THE INVENTION

In one embodiment, the present invention enables a user to invite one or more participants in a SoIP network to join a shared video session hosted by the user. The present invention allows a user to order and store video selections in the network that the user can access later using a personal password. In one embodiment, for all the other users who are invited to join the shared video session, the network provides another one time password that the invited users can use to access the shared video session.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
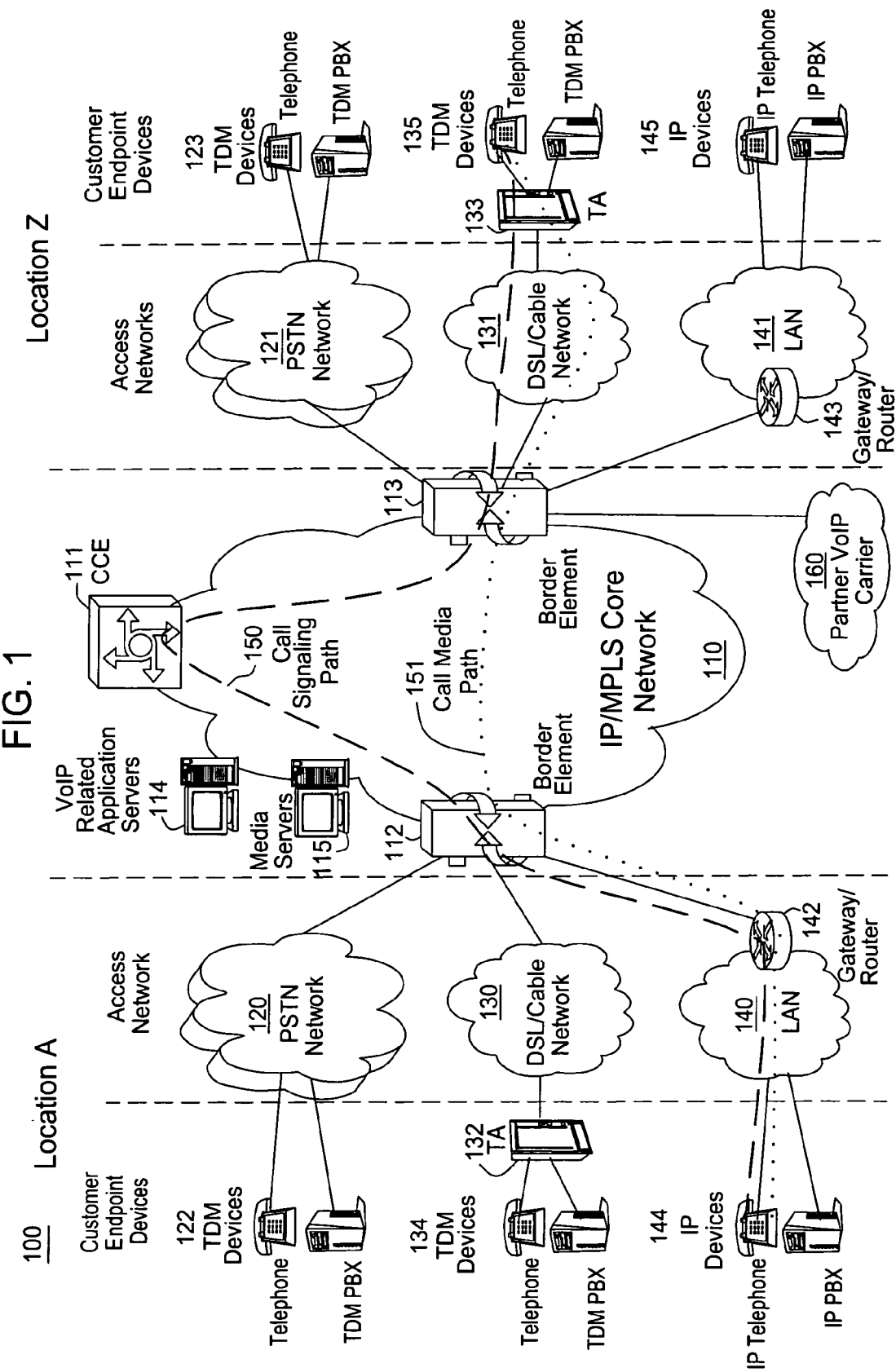
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
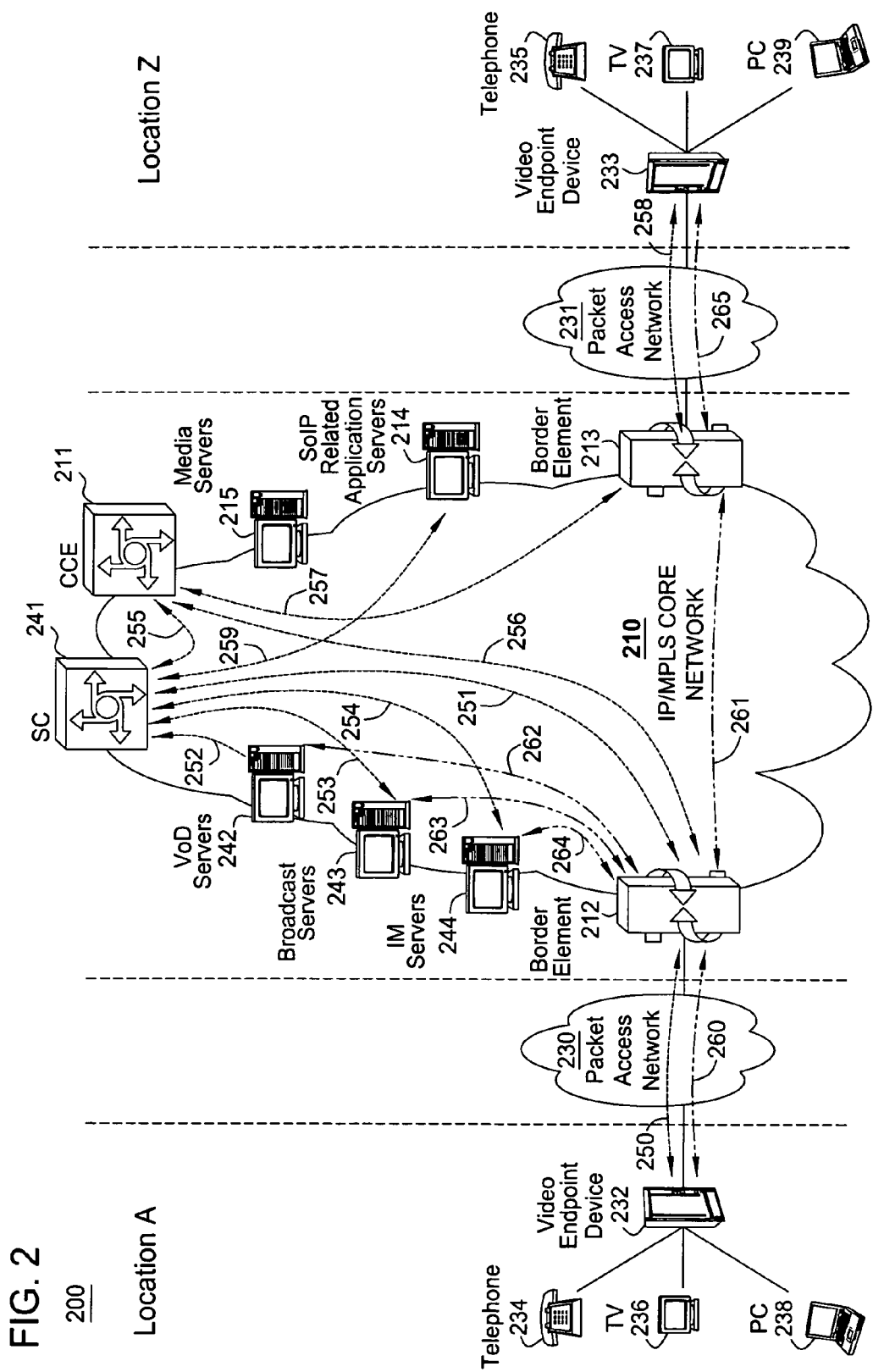
FIG. 2 illustrates an exemplary Service over Internet Protocol (SoIP) network related to the present invention.

The network shown in FIG. 1 can be extended to become a SoIP network that supports multi-service applications including, but not limited to, video services. FIG. 2 illustrates a communication architecture 200 having an example network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, the present invention should not be interpreted to be limited by this particular illustrative architecture.

Video endpoint device 232 and 233 are IP based intelligent multi-service endpoint device supporting voice, video, and data applications. Video endpoint device 232 and 233 are signaling endpoints of application sessions, e.g. a VoIP session endpoint, an instant messaging endpoint, or a video session endpoint. In one embodiment, a video endpoint device is a standalone device that can be connected to home electronic appliances such as, but is not limited to, telephone 234 and 235, TV 236 and 237, or Personal Computer (PC) 238 and 239. In another embodiment, a video endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a video endpoint device to a SoIP network that supports video services.

The core SoIP infrastructure that supports video services comprises of several key components, such the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (242), and Instant Messaging (IM) Servers 243. A BE resides at the edge of the SoIP core infrastructure and interfaces with customers endpoints over various types of access networks. The functions supported by a BE include those supported by a BE as previously described in network 100 and FIG. 1. In addition, in a SoIP network that supports video services, a BE also serves as a gateway between a video endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but is not limited to, Session Initiation Protocol (SIP). A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes as well. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A Broadcast Server is responsible for supporting broadcast video session requested originated by a customer and sends streaming broadcast video contents, such as TV channels, to the customer. The VoD Server and the Broadcast Server sends streaming video contents to video endpoint devices using compression technologies including, but are not limited to, Moving Picture Experts Group (MPEG) 2, MPEG 4, MPEG 7, and MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a video endpoint. In one embodiment, a customer using video endpoint device 232 at location A places a VoD session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to video endpoint 232 using data path segment 260. Similarly, a customer at location Z using TV 237 connected to video endpoint 233 can request a VoD session via SC 241 with streaming VoD contents sent by VoD Server 242. Note that a VoD server may be placed closer to end users in a packet access network to serve video endpoints in an alternative embodiment.

In another embodiment, a customer using video endpoint device 232 at location A places a broadcast video session request to the SoIP network that supports video services using TV 236. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to video endpoint 232 using data path segment 260. Similarly, a customer at location Z using TV 237 connected to video endpoint 233 can request a broadcast video session via SC 241 with streaming broadcast video contents sent by Broadcast Server 243. Note that a Broadcast server may be placed closer to end users in a packet access network to serve video endpoints in an alternative embodiment.

In another embodiment, a customer using video endpoint device 232 at location A places an IM session request to the video network using PC 238. During the session initiation, a setup signaling message is sent from video endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request to sign on an IM session; therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to video endpoint 232 via BE 212 using data path comprising data path segment 260 and 264. Similarly, a customer at location A using TV 236 connected to video endpoint 232 or a customer at location Z using PC 239 or TV 237 connected to video endpoint 233 can request an IM session via SC 241 with IM functions provided by IM Server 244.

In another embodiment, a customer using video endpoint device 232 at location A places a VoIP session request destined to video endpoint device 233 via the SoIP network that supports video services using telephone 234. During the session initiation, a setup signaling message is sent from video endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255. CCE may interact with AS 214 using signaling path segment 259 to verify customer's subscription information or to retrieve VoIP specific applications or data in order to complete the session request. The signaling flows to establish a VoIP call between video endpoint device 232 and 233 is similar to those described previously in network 100 and FIG. 1. In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to video endpoint device 233 using signaling path segment 258. Video endpoint device 233 then identifies telephone 235 and rings that telephone. Once the call is accepted at location Z by the called party, a call acknowledgement signaling message, such as a SIP 200 OK response message if SIP is used, is sent in the reverse direction back to the CCE 211. After the CCE 211 receives the call acknowledgement message, it will then send a call acknowledgement signaling message, such as a SIP 200 OK response message if SIP is used, toward the calling party at location A using signaling path comprising signaling path segment 256 and 250 via BE 212. In addition, the CCE 211 also provides the necessary information of the call to both BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup up between two video endpoint devices, SC 241 and CCE 211 does not need to be in the data path for actual direct data exchange.

As extremely high bandwidth access networks become more accessible to residential subscribers, they enable service providers of these networks to integrate voice, video, and data, thereby providing more convenience for end customers and creating new service opportunities. Due to the multi-service nature of these new services, networks need to provide additional functionalities to end customers to support integrated control of these different types of services. For example, a user of these advanced services can order a video session to be stored and viewed at a later time. More specifically, the user may want to invite other users in the network to join and watch the previously ordered video session simultaneously.

To address this need, the present invention enables a user to invite one or more participants in a SoIP network to join a shared video session hosted by the user. The present invention allows a user to order and store video selections in the network that the user can access later using a personal password. In one embodiment, for all the other users who are invited to join the shared video session, the network provides another one time password that the invited users can use to access the shared video session.

Figure 3:
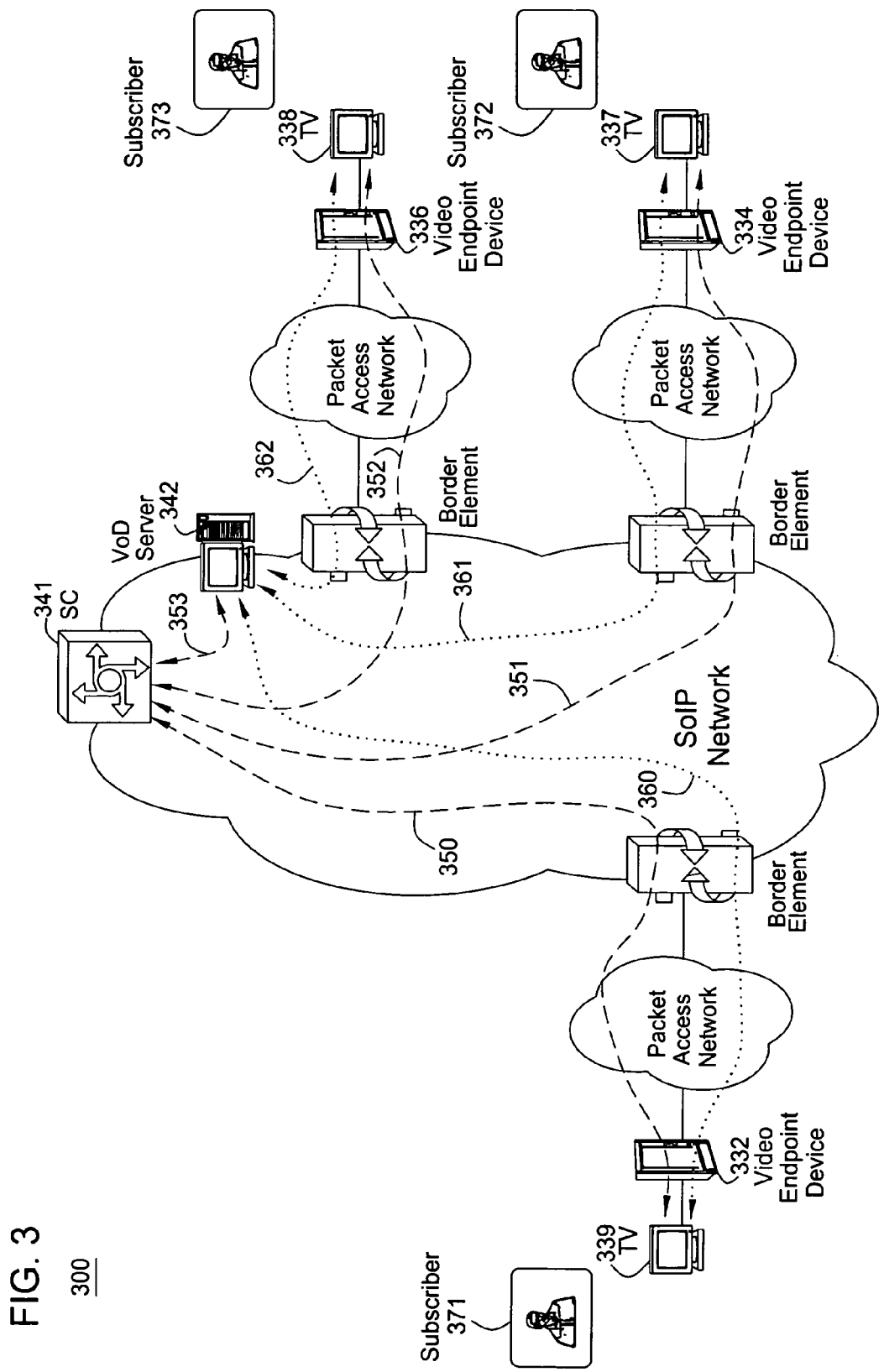
FIG. 3 illustrates an example of stored sharing video sessions in a packet network, e.g., a SoIP network, of the present invention.

FIG. 3 illustrates an example 300 of sharing stored video sessions in a packet network, e.g., a SoIP network, of the present invention. In FIG. 3, subscriber 371 orders a shared video session (broadly covering any image sequence, e.g., a movie, a music video, a video of a musical concert, a video of a play, a video of a sports event, an educational video and the like) to be viewed at a later specified time using TV 339. The shared video session order request is sent by video endpoint device 332 to SC 341 using flow 350. In turn, SC 341 forwards the order request to VoD 342 for order completion using flow 353. Once the shared video session order has been completed, subscriber 371 invites subscriber 372 and subscriber 373 to participate in the video session at the specified time. Both subscribers 372 and 373 accept the invitation to join the shared video session. In order to access the shared video session, subscribers 371, 372, and 373 need to provide passwords to view the shared video session.

Since subscriber 371 is the video session order originator, subscriber 371 uses a personal password to authenticate access to the shared video session. Since subscribers 372 and 373 are invited participants of the shared video session, the network assigns a one time password for their use in order to view the shared video session. In one embodiment, the one time password is assigned by the network and given to subscriber 371 to be distributed to subscribers 372 and 373. In another embodiment, the one time password can be sent directly to subscribers 372 and 373 once subscriber 371 informs the network about the invited participants who have accepted the invitations.

Shortly before the specified start time of the shared video session, subscriber 371 signs on to the shared video session via SC 341 to VoD Server 342 using flow 350. Once subscriber 371 is authenticated using a personal password, SC 341 signals VoD 342 using flow 353 to create a shared video session path to subscriber 371. At about the same time, subscriber 372 uses TV 337 to sign on to the shared video session using a one time or single use password. The sign on request is sent by video endpoint equipment 334 to SC 341 using flow 351. Once subscriber 372 is authenticated using the one time password, SC 341 signals VoD 342 using flow 353 to create a shared video session path to subscriber 372. Similarly, subscriber 373 uses TV 338 to sign on to the shared video session using the one time password. The sign on request is sent by video endpoint equipment 336 to SC 341 using flow 352. Once subscriber 373 is authenticated using the one time password, SC 341 signals VoD 342 using flow 353 to create a shared video session path to subscriber 373.

At the specified start time of the video session, e.g., a movie, VoD 342 begins sending the stream video contents of the shared video session via the three established shared video session paths to subscribers 371, 372, and 373 using flows 360, 361, and 362 respectively. For subscriber 371, VoD Server 342 sends the video session streaming contents to TV 339 via video endpoint 332 using flow 360. For subscriber 372, VoD Server 342 sends the shared video session streaming contents to TV 337 via video endpoint 334 using flow 361. For subscriber 373, VoD Server 342 sends the shared video session streaming contents to TV 338 via video endpoint 336 using flow 362. Note that the video session will be displayed in an independent display frame on each of the video display devices currently used by the subscriber and the invited participants.

Figure 4:
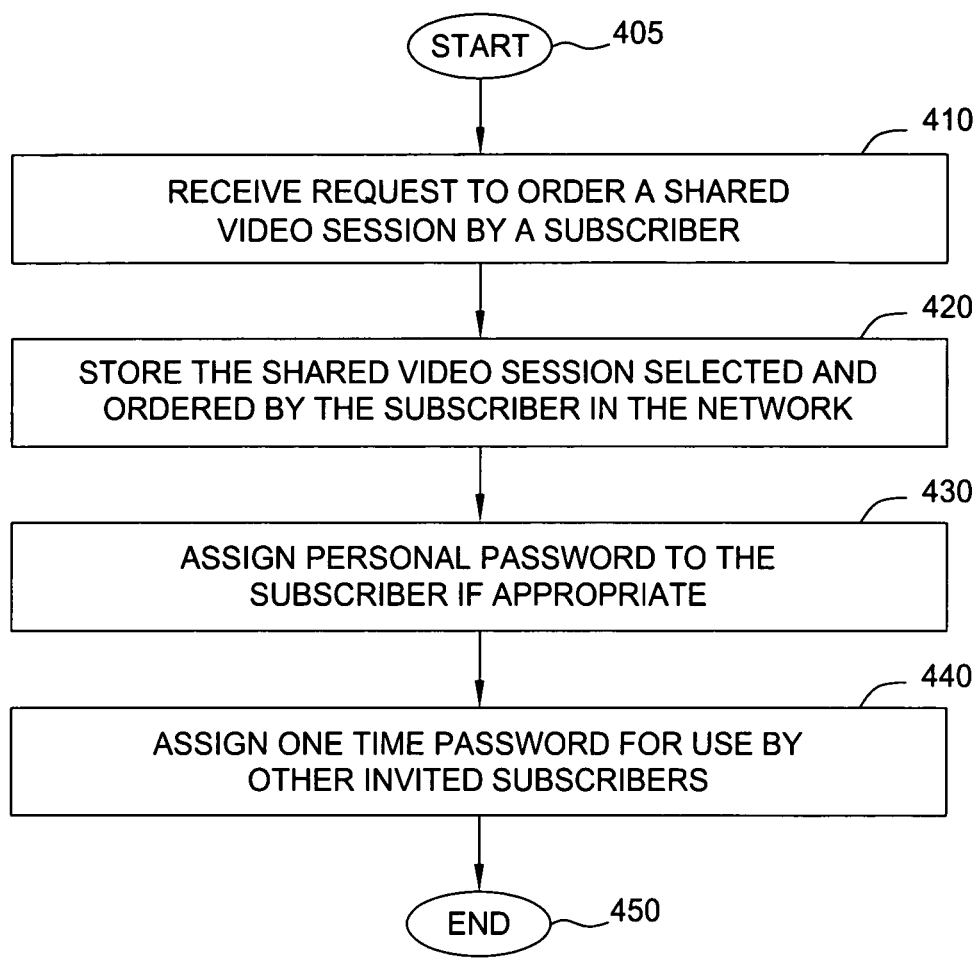
FIG. 4 illustrates a flowchart of a method for ordering a shared video session stored in a packet network, e.g., a SoIP network, of the present invention.

FIG. 4 illustrates a flowchart of a method 400 for ordering a shared video session stored in a packet network, e.g., a SoIP network, of the present invention. Method 400 starts in step 405 and proceeds to step 410.

In step 410, the method receives a request to order a shared video session from a subscriber. For example, the request is received by a SC.

In step 420, the method stores the selected video session ordered by the subscriber in the network after the order has been completed for later retrieval. The order request is forwarded by the SC to a VoD Server and the VoD Server stores the requested video session for the subscriber. For example, if the VoD server does not have the video session, it may acquire the video session from a video session provider and then stores the video session on the VoD server.

In step 430, the method assigns a personal password to the subscriber if a personal password has not already been established. The personal password is assigned by the SC to the subscriber. In order to access the shared video session, the subscriber needs to be authenticated via the personal password to view the shared video session.

In step 440, the method assigns a one time password to be used by invited participants of the shared video session. The one time password is assigned by the SC. In order to access the shared video session, the invited participants need to be authenticated via the one time password to view the shared video session. In one embodiment, the one time password is assigned by the network and given to the subscriber to be distributed to the invited participants. In another embodiment, the one time password can be sent directly to the invited participants once the subscriber informs the network about the invited participants who have accepted the invitations. The method ends in step 450.

Figure 5:
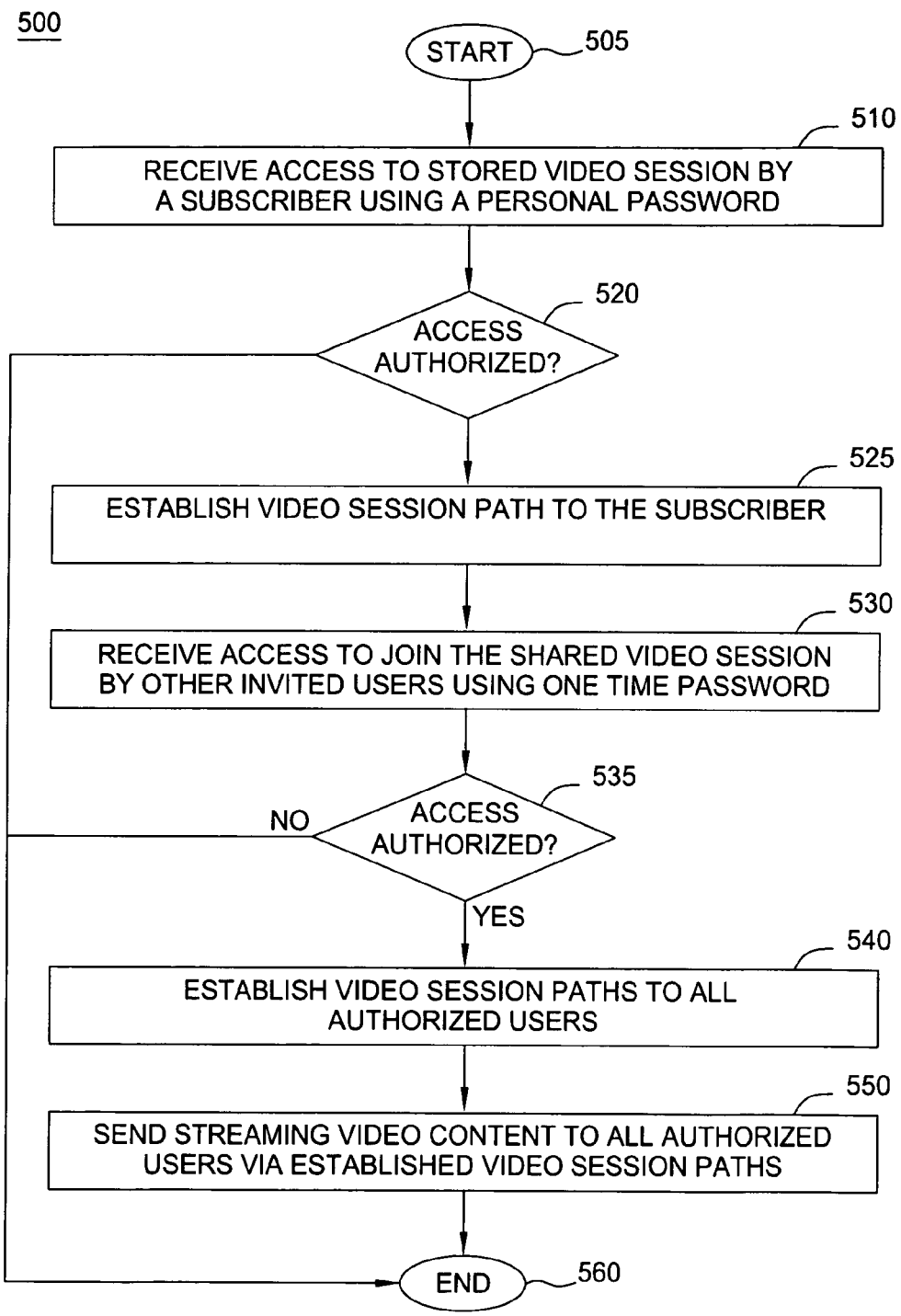
FIG. 5 illustrates a flowchart of a method for activating a shared video session stored in a packet network, e.g., a SoIP network, of the present invention.

FIG. 5 illustrates a flowchart of a method 500 for activating a shared video session stored in a packet network, e.g., a SoIP network, of the present invention. Method 500 starts in step 505 and proceeds to step 510.

In step 510, the method receives access request to a shared video session from a subscriber using a personal password. For example, the access request is received by the SC.

In step 520, the method authenticates the access using the personal password supplied. The access is authenticated by the SC. If the personal password is authenticated successfully, the access is authorized and the method proceeds to step 525; otherwise, the method proceeds to step 560.

In step 525, the method establishes a shared video session path to the subscriber. The SC forwards the access request to the VoD Server for session establishment. The VoD Server then establishes a video session path to the subscriber.

In step 530, the method receives access requests from one or more invited participants to join the shared video session using a one time password. For example, the access requests are received by the SC.

In step 535, the method authenticates the access requests using the one time password supplied. The access requests are authenticated by the SC. If the personal password is authenticated successfully, the access requests are authorized and the method proceeds to step 540; otherwise, the method proceeds to step 560.

In step 540, the method establishes one or more shared video session paths to the invited participants who have accepted the shared video session invitations and have been authorized to view the shared video session. The SC forwards the access request to the VoD Server for session establishment. The VoD Server then establishes one or more video session paths to the invited participants.

In step 550, the method sends the streaming video contents associated with the shared video session to the subscriber and all the invited participants via the already established shared video session paths. The streaming video contents are sent by the VoD Server. Note that the video session will be displayed in an independent display frame on each of the video display devices currently used by the subscriber and the invited participants. The method ends in step 560.

Figure 6:
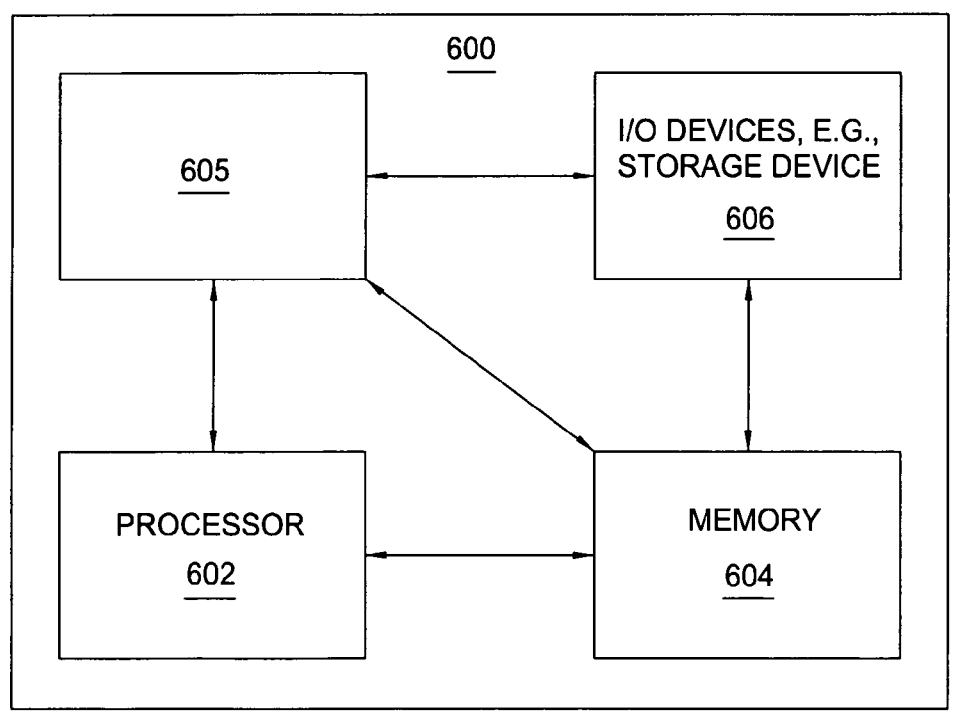
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a sharing of stored video sessions module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present sharing of stored video sessions module or process 605 can be loaded into memory 604 and executed by processor 602 to implement the functions as discussed above. As such, the present sharing of stored video sessions process 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for sharing a video session in a communication network, comprising:
storing, by a processor, the video session in a video on demand server in the communication network for later viewing, wherein the video session is specified in an order from a subscriber to the video on demand server;
receiving, by the processor, a request by the subscriber to share the video session with an invited participant at a specified time as defined by the subscriber and included in the request after the order for the video session is completed and before the video session is viewed;
assigning, by the processor, a one time password to the invited participant;
providing, by the processor, the one time password to the subscriber for distribution to the invited participant to allow the invited participant to access the video session; and
providing, by the processor, the video session from the video on demand server via the communication network in a streaming session to the subscriber and the invited participant at the specified time as defined by the subscriber where the video session is simultaneously provided to a first display of the subscriber and a second display of the invited participant, wherein the first display and the second display are different, wherein the providing comprises:
establishing a video session path to the subscriber when an access request to the video session is received from the subscriber; and
establishing an individual video session path to the invited participant when a corresponding access request to the video session is received from the invited participant.

2. The method of claim 1, wherein the communication network is a service over internet protocol network.

3. The method of claim 1, further comprising:
assigning a first password to the subscriber for authenticating access to the video session.

4. The method of claim 3, wherein the first password is assigned by a session controller.

5. The method of claim 1, wherein the access request from the subscriber and the access request from the invited participant are received and authenticated by a session controller.

6. The method of claim 1, wherein the establishing a video session path to the subscriber comprises:
authenticating the access request using a password supplied by the subscriber; and
establishing the video session path between the subscriber and the video on demand server if the access request is authenticated successfully.

7. The method of claim 1, wherein the establishing an individual video session path to each of the invited participant comprises:
authenticating the access requests using the one time password supplied by the invited participant; and
establishing the individual video session path between the invited participant and the video on demand server if the access request is authenticated successfully.

8. The method of claim 1, further comprising:
sending a video content associated with the video session to the subscriber and the invited participant for viewing using the established video session paths.

9. A non-transitory computer-readable medium storing a plurality of instructions which, when executed by a processor, cause the processor to perform operations for sharing a video session in a communication network, the operations comprising:
- storing the video session in a video on demand server in the communication network for later viewing, wherein the video session is specified in an order from a subscriber to the video on demand server;
- receiving a request by the subscriber to share the video session with an invited participant at a specified time as defined by the subscriber and included in the request after the order for the video session is completed and before the video session is viewed;
- assigning a one time password to the invited participant;
- providing the one time password to the subscriber for distribution to the invited participant to allow the invited participant to access the video session; and
- providing the video session from the video on demand server via the communication network in a streaming session to the subscriber and the invited participant at the specified time as defined by the subscriber where the video session is simultaneously provided to a first display of the subscriber and a second display of the invited participant, wherein the first display and the second display are different, wherein the providing comprises:
  - establishing a video session path to the subscriber when an access request to the video session is received from the subscriber; and
  - establishing an individual video session path to the invited participant when a corresponding access request to the video session is received from the invited participant.

10. The non-transitory computer-readable medium of claim 9, wherein the communication network is a service over internet protocol network.

11. The non-transitory computer-readable medium of claim 9, further comprising:
- assigning a first password to the subscriber for authenticating access to the video session.

12. The non-transitory computer-readable medium of claim 11, wherein the first password is assigned by a session controller.

13. The non-transitory computer-readable medium of claim 9, wherein the access request from the subscriber and the access request from the invited participant are received and authenticated by a session controller.

14. The non-transitory computer-readable medium of claim 9, wherein the establishing a video session path to the subscriber comprises:
- authenticating the access request using a password supplied by the subscriber; and
- establishing the video session path between the subscriber and the video on demand server if the access request is authenticated successfully.

15. The non-transitory computer-readable medium of claim 9, wherein the establishing an individual video session path to each of the invited participant comprises:
- authenticating the access requests using the one time password supplied by the invited participant; and
- establishing the individual video session path between the invited participant and the video on demand server if the access request is authenticated successfully.

16. An apparatus for sharing a video session in a communication network, comprising:
- a processor; and
- a tangible computer-readable medium storing a plurality of instructions which, when executed by the processor, cause the processor to perform operations, the operations comprising:
  - storing the video session in a video on demand server in the communication network for later viewing, wherein the video session is specified in an order from a subscriber to the video on demand server;
  - receiving a request by the subscriber to share the video session with an invited participant at a specified time as defined by the subscriber and included in the request after the order for the video session is completed and before the video session is viewed;
  - assigning a one time password to the invited participant;
  - providing the one time password to the subscriber for distribution to the invited participant to allow the invited participant to access the video session; and
  - providing the video session from the video on demand server via the communication network in a streaming session to the subscriber and the invited participant at the specified time as defined by the subscriber where the video session is simultaneously provided to a first display of the subscriber and a second display of the invited participant, wherein the first display and the second display are different, wherein the providing comprises:
    - establishing a video session path to the subscriber when an access request to the video session is received from the subscriber; and
    - establishing an individual video session path to the invited participant when a corresponding access request to the video session is received from the invited participant.

* * * * *